United States Patent [19]

Ito

[11] Patent Number: 4,628,454
[45] Date of Patent: Dec. 9, 1986

[54] AUTOMATIC RUNNING WORK VEHICLE

[75] Inventor: Katsumi Ito, Osaka, Japan

[73] Assignee: Kubota, Ltd., Osaka, Japan

[21] Appl. No.: 496,566

[22] Filed: May 20, 1983

[30] Foreign Application Priority Data

Jul. 13, 1982 [JP] Japan ................................ 57-121565

[51] Int. Cl.$^4$ ........................ G06F 15/50; B62D 1/28
[52] U.S. Cl. .................................. 364/424; 180/168; 364/449
[58] Field of Search ............... 364/424, 449, 450, 460; 318/578; 180/167, 168, 169; 901/1

[56] References Cited

U.S. PATENT DOCUMENTS

| | | | |
|---|---|---|---|
| 3,715,572 | 2/1973 | Bennett | 364/436 X |
| 3,952,828 | 4/1976 | Stampfer et al. | 180/79.1 |
| 4,119,900 | 10/1978 | Kremnitz | 318/578 |
| 4,158,162 | 6/1979 | Hawkins | 318/578 |
| 4,211,921 | 7/1980 | Kanetou et al. | 250/202 |
| 4,309,758 | 1/1982 | Halsall et al. | 364/424 |
| 4,402,050 | 8/1983 | Tagami et al. | 364/460 |
| 4,424,875 | 1/1984 | Yoshida | 364/424 X |
| 4,465,155 | 8/1984 | Collins | 364/424 X |
| 4,556,940 | 12/1985 | Katoo et al. | 364/424 |

FOREIGN PATENT DOCUMENTS 58-141705  8/1983  Japan .

OTHER PUBLICATIONS

Stauffer: Heath's New Training Robot Interacts with Environment, Robotics Today, Dec. 1982, pp. 37,38.

Primary Examiner—Felix D. Gruber
Attorney, Agent, or Firm—Cushman, Darby & Cushman

[57] ABSTRACT

An automatic running work vehicle which is adapted to repeat a running travel reciprocatingly and which has means for teaching the running course of one travel by sampling the running direction detected by an orientation sensor every predetermined running distance detected by a distance sensor during the travel and for steering the work vehicle based on the information of running course taught by the preceding travel when follower sensors fail to detect the boundary of the running course for a predetermined period of time.

7 Claims, 11 Drawing Figures

AUTOMATIC RUNNING WORK VEHICLE

BACKGROUND OF THE INVENTION

1. Field of the Invention

The present invention relates to an automatic running work vehicle, and more particularly to such a work vehicle which is adapted to perform work on the ground of a work site while repeating a running travel reciprocatingly and which has follower sensors for detecting the boundary between a worked area and an unworked area for each travel so as to run along the boundary automatically.

2. Description of the Prior Art

With automatic running work vehicles of this type heretofore known, sensors are mounted on the vehicle body for detecting the boundaries of running areas to automatically steer the wheels along the boundary detected by the sensors and automatically run the vehicle on a predetermined course along the boundary under follower control.

According to the conventional mode of follower control, however, the vehicle is merely so controlled as to automatically cover a specified work site by performing each of reciprocating travels along the boundary between the unworked area and the area already worked on by the preceding travel, so that there is the following drawback.

When the boundary defining a running course has a break, for example, due to the presence of an obstacle or absence of the object to be worked on, it is impossible to run the vehicle under continued follower control, with the result that the vehicle deviates greatly from the specified running course.

SUMMARY OF THE INVENTION

An object of the present invention, which has been accomplished in view of the above problem, is to provide a work vehicle which is adapted to run automatically with good stability at all times without greatly deviating from the contemplated running course even if the course has at an intermediate portion thereof an obstacle or an area where the object to be worked on is absent.

To fulfill this object, the automatic running work vehicle of the invention is adapted to repeat a running travel reciprocatingly and has follower sensors for detecting the boundary between a worked area and an unworked area for each travel. The work vehicle is characterized in that it is provided with a distance sensor for detecting the running distance of its body, an orientation sensor for detecting the running direction thereof, and means for teaching the running course of one travel by sampling the running direction detected by the orientation sensor every predetermined running distance detected by the distance sensor during the travel and for steering the work vehicle based on the information of running course obtained by the teaching of the preceding travel when the follower sensors fail to detect the boundary for a predetermined period of time.

Because of the above feature, the work vehicle has the following great advantage.

When the follower sensors become no longer able to detect the boundary of the running area during running, the vehicle runs automatically based on the information of teaching obtained in the preceding travel, so that the vehicle can be driven automatically with good stability without deviating greatly from the specified running course.

Other objects and advantages of the present invention will become apparent from the following description.

DESCRIPTION OF THE PREFERRED EMBODIMENT

Figure 1:
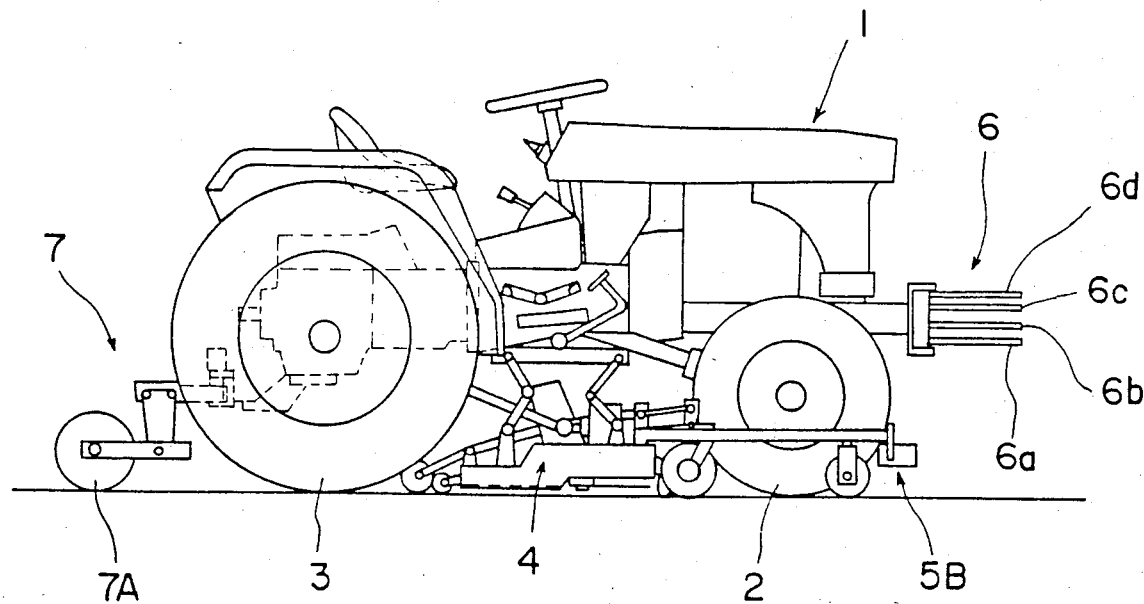
FIG. 1 is an overall side elevation showing a mower as an unmanned work vehicle embodying the invention.
Figure 2:
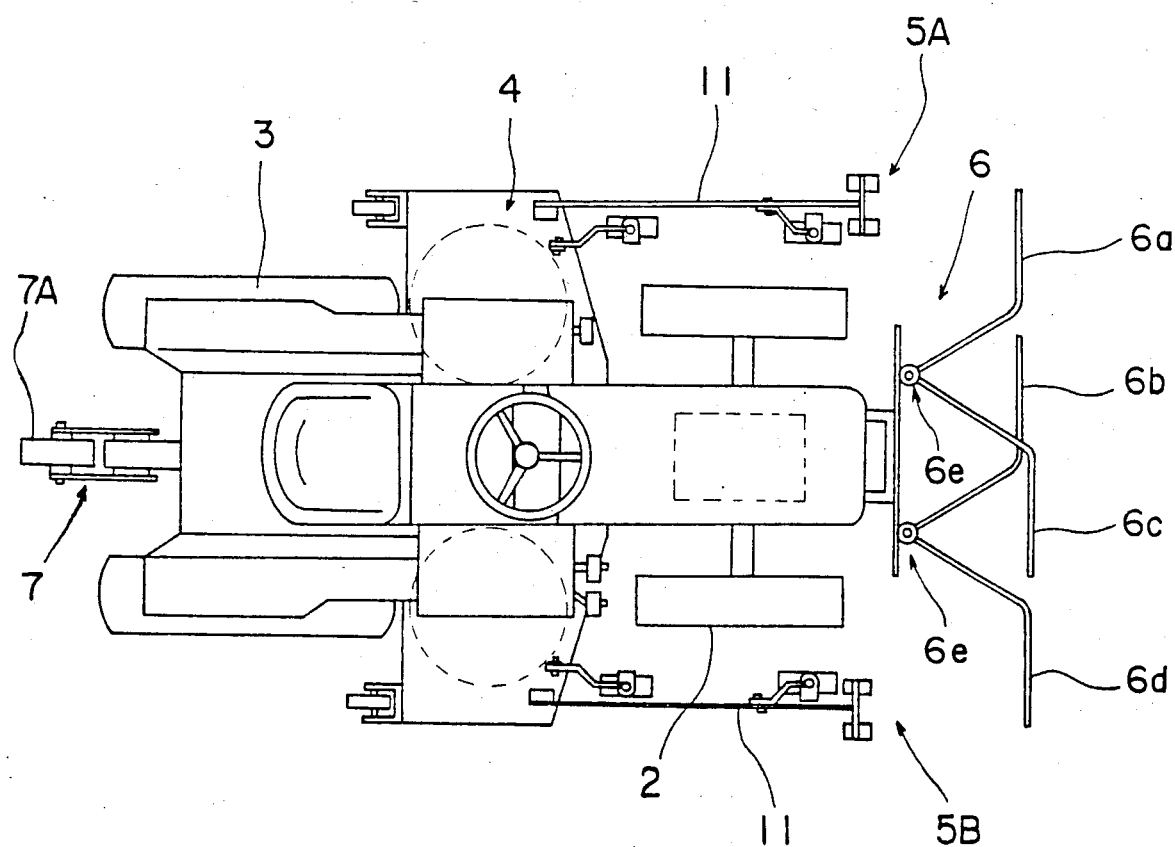
FIG. 2 is an overall plan view showing the mower.

With reference to FIGS. 1 and 2, a vehicle body 1 has a mower assembly 4 vertically movably suspended therefrom and positioned between its front and rear wheels 2, 3. The vehicle body 1 further has on opposite sides of its front portion follower sensors 5A, 5B having the construction to be described below for detecting the boundary of a running area, i.e., the boundary between an unmowed area and a mowed area. Thus the mower is steered along the boundary detected by the follower sensors 5A, 5B to automatically run a specified running course.

The mower is further provided ahead of its body 1 with an obstacle sensor 6 of the non-contact type for detecting obstacles on the running course.

Additionally the vehicle body 1 has a fifth wheel 7A serving as a distance sensor 7 for generating a pulse per optional unit running distance K to continuously detect the distance of travel of the vehicle body 1, and an orientation sensor 8 for detecting the running direction of the body 1.

Usually the front wheels 2, 2 are adapted to be steered rightward or leftward by a hydraulic cylinder 9 by a predetermined amount based on the result of detection of the boundary by the follower sensors 5A, 5B or on the result of detection of an obstacle by the sensor 6.

Each of the follower sensors 5A, 5B comprises a pair of photosensors $S_1$, $S_2$ ($S'_1$, $S'_2$) of identical structure disposed ahead of each side of the mower assembly 4.

Figure 3:
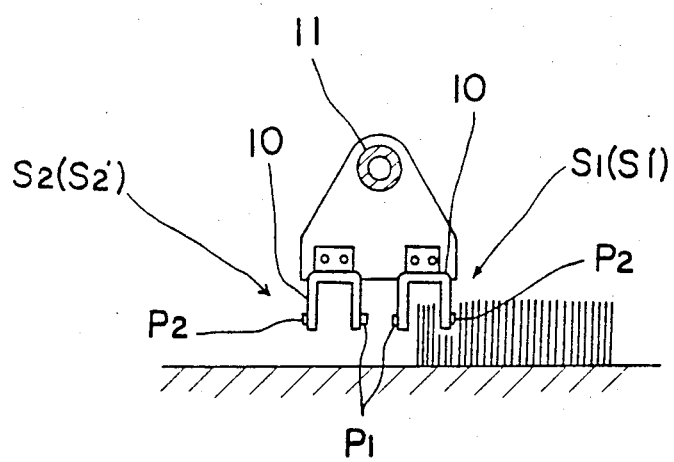
FIG. 3 is a fragmentary front view showing a follower sensor.

FIG. 3 shows the structure of the photosensors $S_1$, $S_2$ ($S'_1$, $S'_2$). A sensor mount frame 11 attached to the mower assembly 4 is fixedly provided with substantially U-shaped sensor frames 10, 10 arranged side by side laterally of the vehicle body 1. Each sensor frame 10 has a pair of light-emitting element $P_1$ and photocell $P_2$ on the opposed inner sides thereof for detecting the presence or absence of grass to be brought into the space therebetween with the travel of the vehicle body 1 to detect the boundary between the mowed area and the unmowed area.

Figure 4:
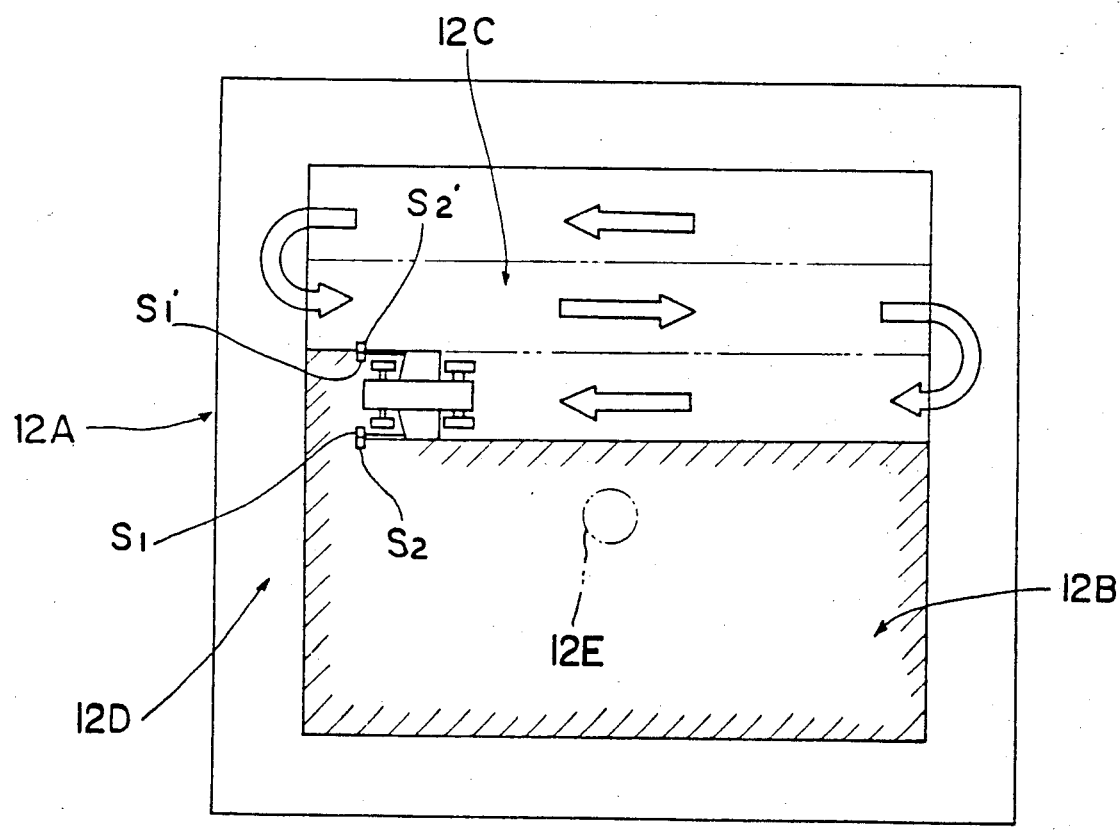
FIG. 4 is a diagram showing a specified running course.

It is seen in FIG. 4 that when the follower sensor 5A composed of the photosensors $S_1$, $S_2$ or the follower sensor 5B composed of the photosensor $S'_1$, $S'_2$ is in the unmowed area 12B, the vehicle is so steered for running that the outer photosensor $S_2$ or $S'_2$ only of the other follower sensor is positioned in the mowed area 12C. Upon reaching a turning area 12D around the mowing area 12A, the vehicle is turned toward the follower sensor which has been in the unmowed area 12B. The turning area 12D is made a mowed area in advance by non-automatically driving the mower. Upon the arrival of the vehicle at the turning area 12D, all the four photosensors $S_1$, $S_2$ and $S'_1$, $S'_2$ constituting the follower sensors 5A, 5B detect the mowed area, indicating the arrival.

The follower sensors 5A, 5B are not limited to those comprising photosensors $S_1$, $S_2$ and $S'_1$, $S'_2$ but can be composed of other sensors of the non-contact, contact or any other type.

The obstacle sensor 6 comprises four contact members 6a, 6b, 6c, 6d arranged ahead of the vehicle body 1 approximately over the entire width of the body 1 therealong, usually biased forward and each individually turnable rearward by contact with an obstacle, and switches $S_3$, . . . provided at the base ends 6e, . . . thereof for detecting the turn of the contact members 6a, 6b, 6c, 6d, respectively.

The position where an obstacle comes into contact with the sensor 6 is detectable in four divided ranges corresponding to the operative positions of the switches $S_3$, . . .

The orientation sensor 8 comprises a potentiometer 8a mounted on an axle portion of the front wheels 2, 2 for detecting the steering direction and the amount of steering, i.e., the angular deflection of the front wheels. The orientation sensor 8, which is thus adapted to detect the steering angle of the front wheels 2, 2, may alternatively be adapted to detect the running direction of the fifth wheel 7A serving as the distance sensor 7. Also usable is a sensor of some other type, such as one which detects the running direction of the vehicle body 1 by sensing the geomagnetism. In brief, the sensor may be of any type insofar as it is capable of detecting the running direction of the vehicle body 1.

The control system will be described below for automatically controlling the running of the mower based on the detection signals from the sensors 5A, 5B, 6, 7 and 8 of the foregoing constructions.

Figure 5:
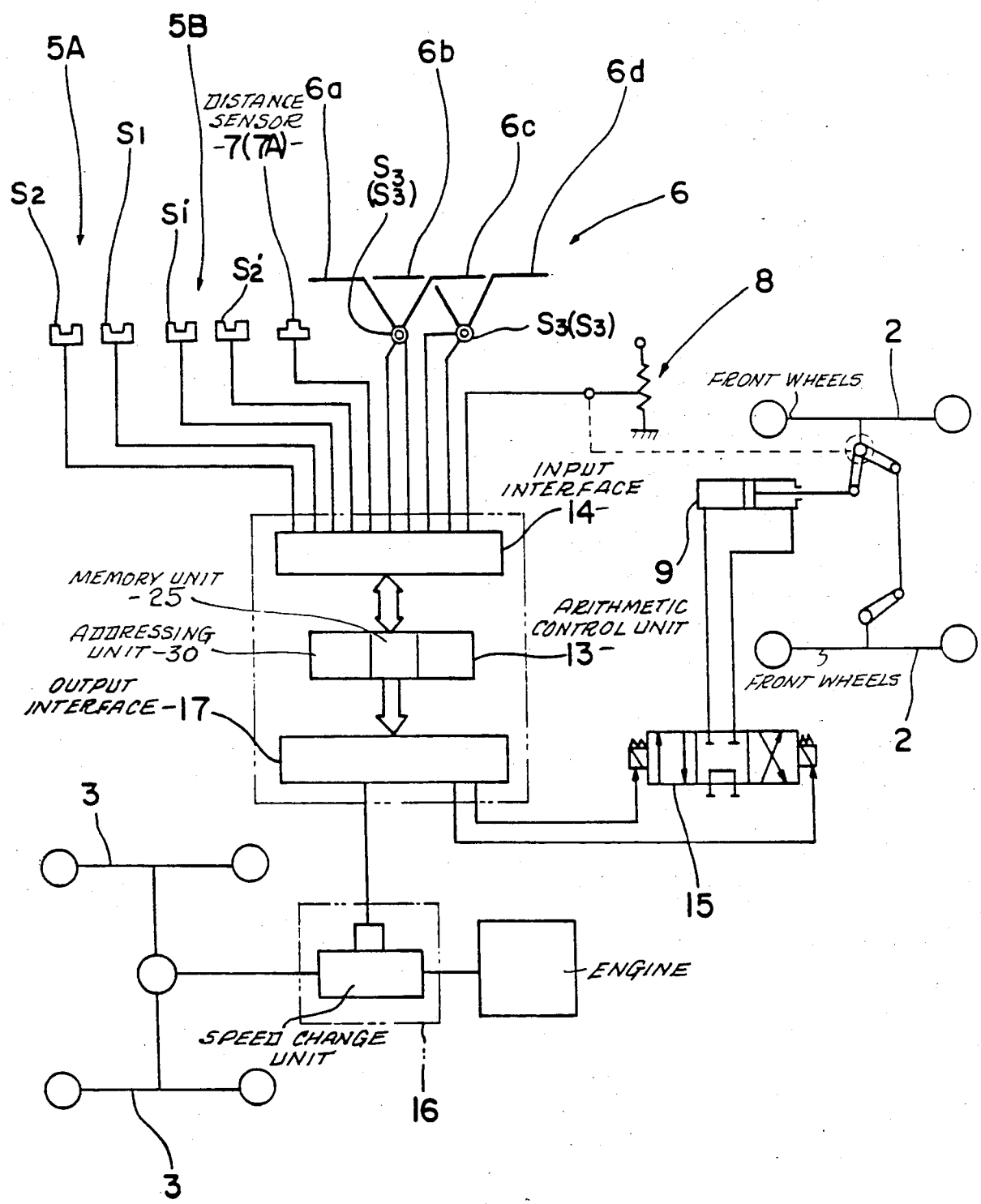
FIG. 5 is a block diagram showing a control system.

With reference to FIG. 5, the control system comprises an arithmetic control unit 13 the main portion of which is a microcomputer. The signals from the follower sensors 5A, 5B, the obstacle sensor 6, the distance sensor 7 and the orientation sensor 8 are fed to the unit 13 via an input interface 14. Based on the signals from these sensors, the unit 13 performs an arithmetic operation and gives the result, i.e., control signals, to an output interface 17 to cause an electromagnetic valve 15 to drive the hydraulic cylinder 9 which is an actuator, thus operating the front wheels 2, 2 and a speed change unit 16.

Usually the control system steers the front wheels 2, 2 in response to the signals from the follower sensors 5A, 5B which discrimanate between the unmowed area 12B and the mowed area 12C to run the vehicle body along the boundary therebetween in the mowing area 12A under follower control as seen in FIG. 4.

Figure 6A:
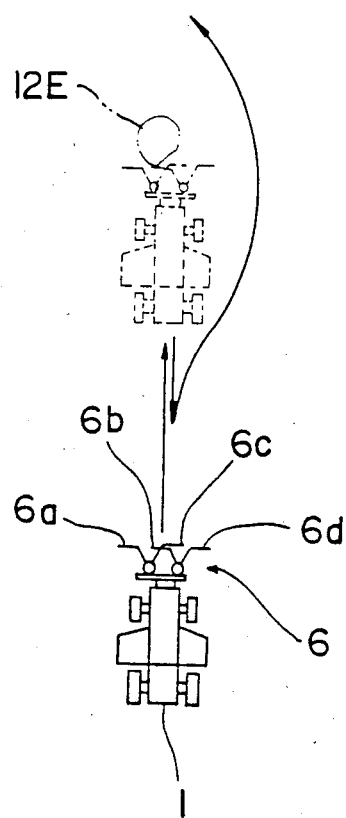
FIGS. 6 (A) and (B) are diagrams each showing how to detour an obstacle.
Figure 6B:
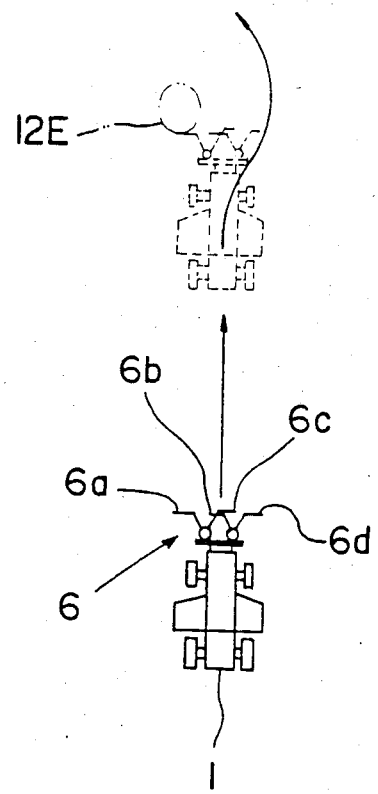
Figure 7A:
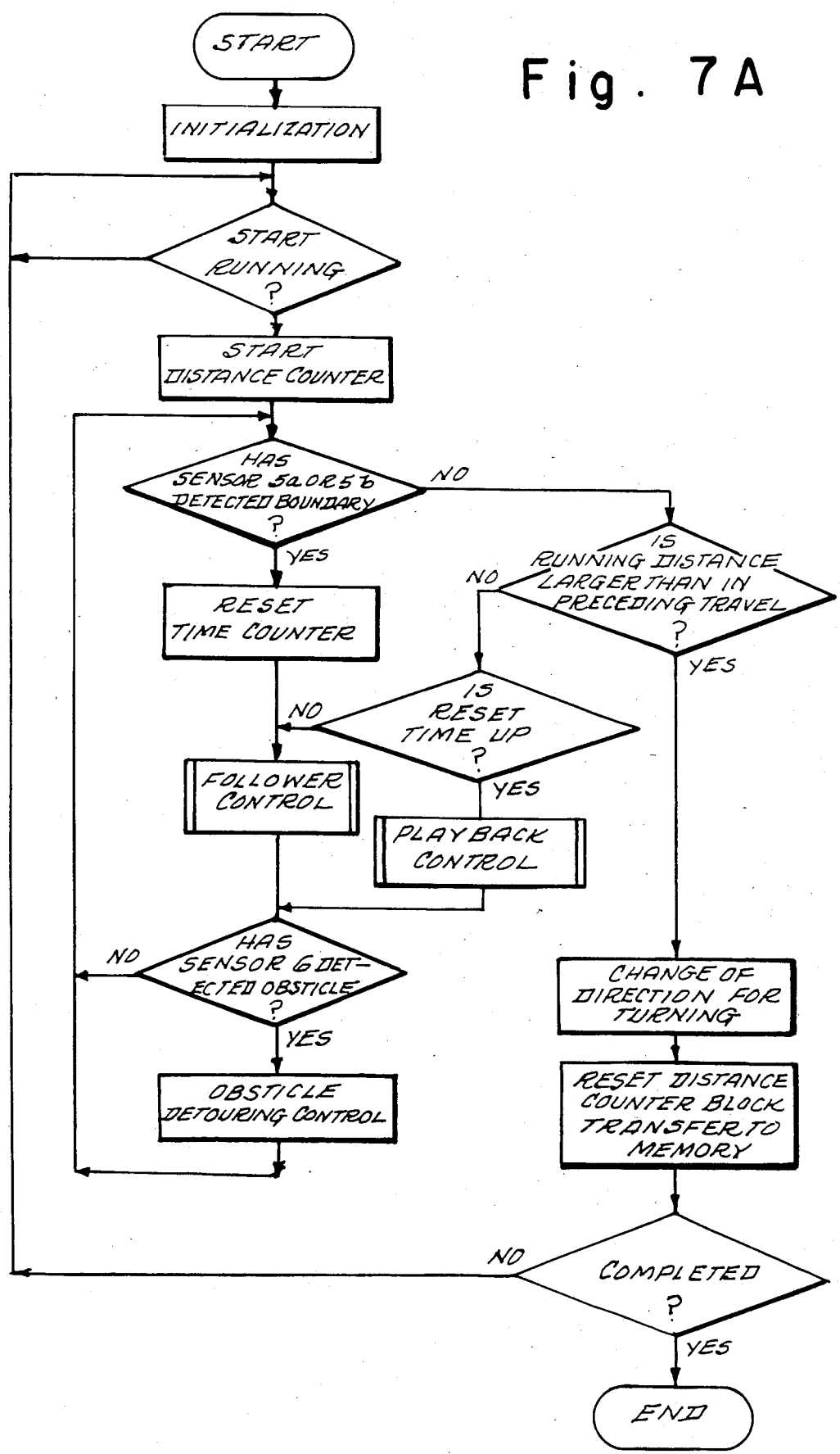
FIGS. 7 (A) to (D) are a flow chart showing the operation of the control system.
Figure 7B:
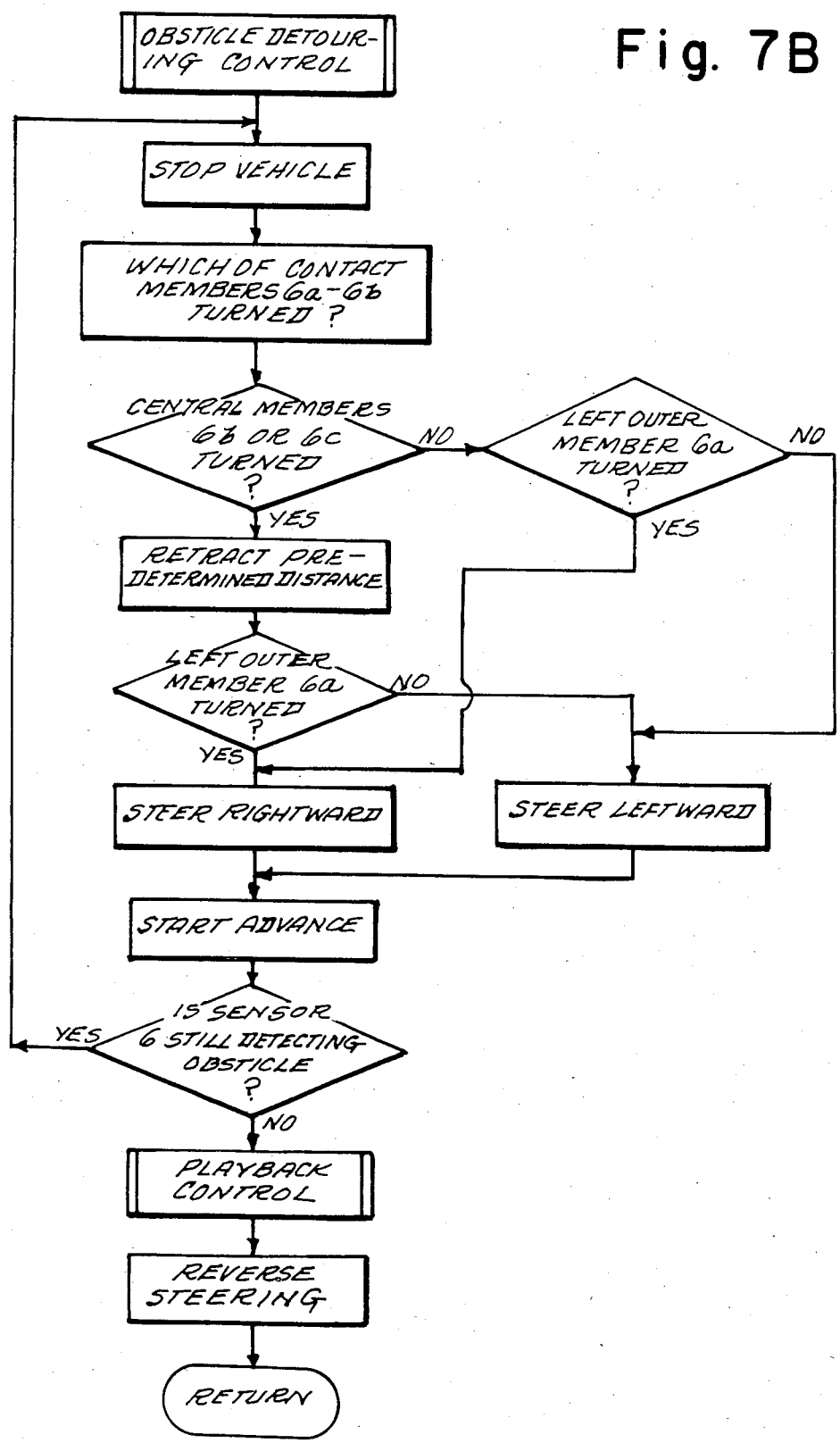
Figure 7C:
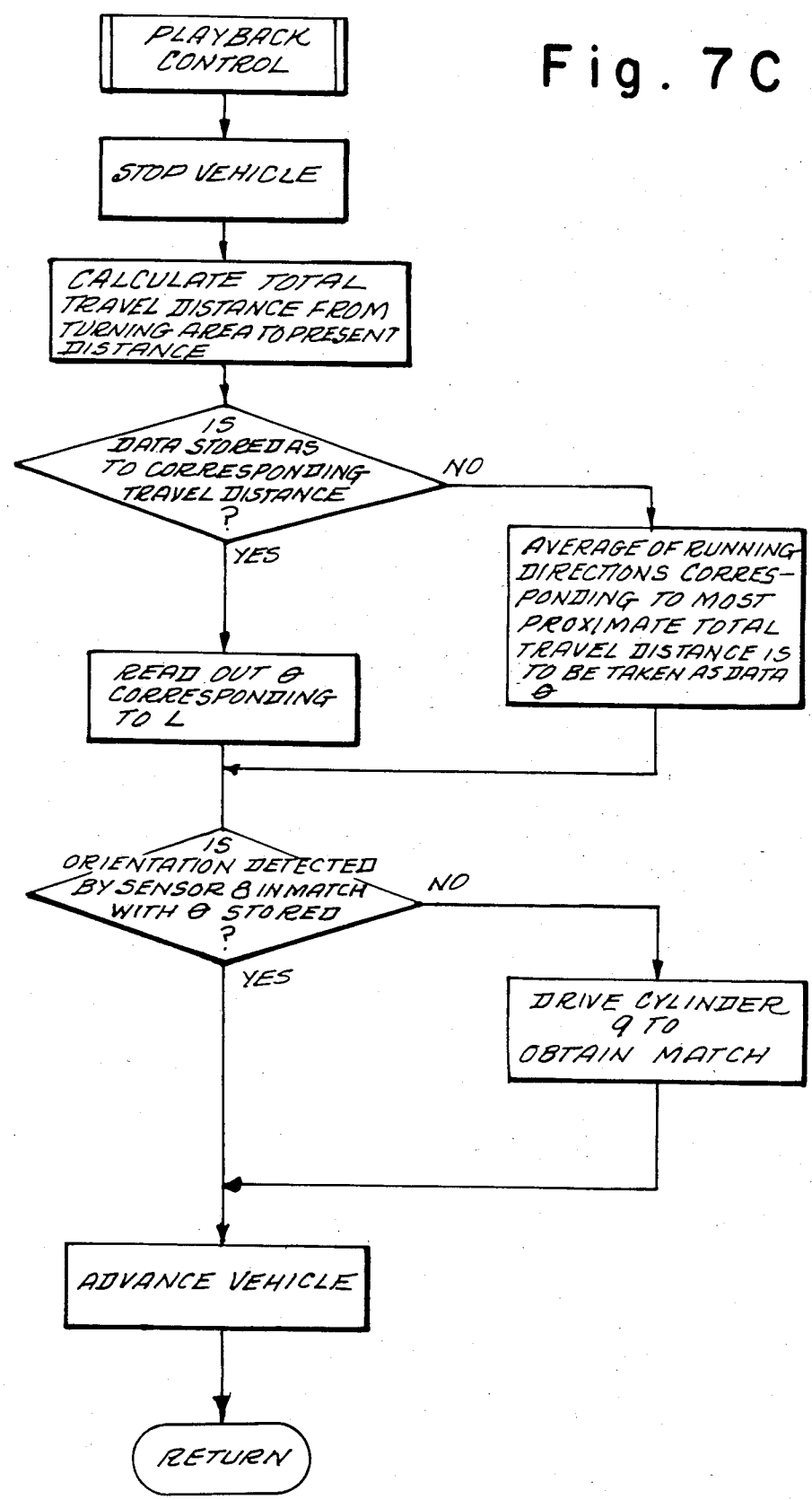
Figure 7D:
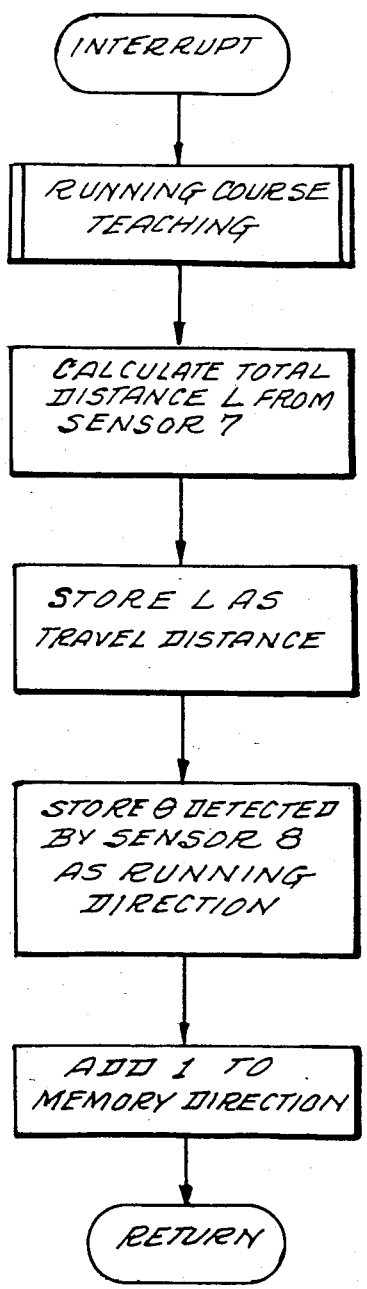

When the obstacle sensor 6 detects an obstacle 12E on the running course surrounded by the turning area 12D during running, the vehicle body is subjected to obstacle detouring control as shown in FIG. 6 (A) or (B) in preference to the follower control based on the detection signals from the follower sensors 5A, 5B.

The obstacle detouring control will be described below.

When one of the switches $S_3$, . . . of the obstacle sensor 6 is turned on upon detecting an obstacle, the follower control is interrupted, and the speed change unit 16 is operated to temporarily stop the vehicle body 1. The switch $S_3$ actuated is identified to determine which of the contact members 6a, 6b, 6c, 6d has come into contact with the obstacle. If the contact member 6b or 6c in the center is in contact therewith, the vehicle body 1 is retracted a predetermined distance once and then advanced as steered toward a given direction as shown in FIG. 6 (A). When the vehicle body is to be thus retracted temporarily, the data indicating the particular contact member in contact with the obstacle is temporarily stored in the memory 25, via the addressing unit 30 to determine the detouring direction, and the vehicle is thereafter steered in the detouring direction immediately before it is advanced. The detouring direction determined is toward one side opposite the particular contact member concerned.

If only one of the outer members 6a, 6d has come into contact with the obstacle, the vehicle is advanced as steered toward a direction opposite to that member as shown in FIG. 6 (B).

After the vehicle has been brought into the advance travel for detouring the obstacle, the vehicle is steered according to the running course information obtained by teaching in the course of the preceding travel as will be described later, to automatically return to the running course before the detouring. The control by the follower sensors 5A, 5B is thereafter resumed to automatically drive the vehicle in the specified direction.

The information as to the course run by the vehicle under the follower control as well as under the obstacle detouring control will be sampled processed by the addressing unit 30 and stored in the memory 25 for teaching in the following manner.

As shown in FIG. 7 (D), the running course sampling is an interrupt process which is initiated most preferentially in response to a pulse count signal emitted by the distance sensor 7 every predetermined distance of travel, $l_0$, which is predetermined as the sampling interval for the running course.

With reference to FIG. 7 (A), the overall control program is so designed as to sample and store the running course information for every travel which is initiated upon the detection of the unmowed area 12B by one of the photosensors $S_1$, $S_2$, $S'_1$, $S'_2$ constituting the follower sensors 5A, 5B with the advance of the vehicle body 1 from the turning area 12D into the unmowed area 12B shown in FIG. 4 and which is completed when the mowed turning area 12D is detected by all the photosensors $S_1$, $S_2$, $S'_1$, $S'_2$.

More specifically stated, when the vehicle body 1 starts running under follower control from one end of the turning area 12D around the unmowed area 12B, a counter simultaneously starts counting up the pulse signals from the distance sensor 7, and every time the vehicle body 1 has run the predetermined distance $l_0$, the running direction $\theta$ detected by the orientation sensor 8 at that time and the total distance $l$ of travel after the start of counting are incrementally addressed by the addressing unit 30, and stored in a specified memory area within the control unit 13 as teaching data obtained by sampling the running course. The running course is sampled and stored also when the vehicle is under the obstacle detouring control by similarly storing the steering angle, i.e., the running direction $\theta$, every time the vehicle has covered the travel distance $l_0$.

As seen in FIG. 4, the running direction of the vehicle body which repeats a travel reciprocatingly reverses from travel to travel. In the subsequent travel, therefore, the running course information obtained by the teaching of the preceding travel is read out in an order reverse to the storing order. Thus the data is retrieved from the memory 25 in response to the signals from the distance sensor by reversely referring to the address concerned i.e. decrementing the address.

Further upon lapse of a predetermined period of time after at least one of the follower sensors 5a, 5B has ceased to detect any unmowed area during the running course teaching, reference is made to the running course information l, θ obtained by the teaching of the preceding travel, and the vehicle body 1 is advanced as forcibly steered toward a direction reversed through 180° from the running direction θ at the corresponding point at a total travel distance l from the turning area 12D, whereby the vehicle body is made to automatically run in the desired direction. This mode of playback control is illustrated in FIG. 7 (C). Under the playback control, the vehicle body can be so steered that it will not greatly deviate from the running course even if the course has an intermediate portion where the follower sensors 5a, 5B are unable to discriminate between the boundary of running area and the turning area due to the absence of grass.

Further when the vehicle body is subjected to obstacle detouring control during running, the running course after detouring the obstacle 12E is corrected with reference to the running course information l, θ given by the teaching of the preceding travel. Thus the vehicle body is steered to automatically return to the specified running course.

When the vehicle body changes its direction at the turning area 12D, the running course information l, θ newly taught in the present travel is block-transferred to the memory area storing the information of the preceding travel. The vehicle therefore runs along the boundary of running area under follower control with the contents of its memory renewed from travel to travel.

In this way, the vehicle is automatically taught the running course information as to one travel only, so that a memory of greatly reduced capacity is usable for storing the running course information l, θ, while there is no need for the operator to teach the running course.

FIGS. 7 (A) to (D) are a flow chart showing the operation of the control unit 13 described above.

I claim:

1. An automatic running work vehicle controllable to travel along a series of parallel straight courses on a defined work site, following a boundary between a worked area and an unworked area, and to reverse its travelling direction at an end of each of the courses, said vehicle comprising:
   a plurality of position sensor means for detecting said boundary and a beginning and an end of said courses,
   transmitter means for transmitting a pulse per unit of travelling distance upon detection of said beginning of the course by said position sensor means, and for continuing to transmit said pulse per unit of travelling distance until detection of said end of the course by said position sensor means,
   orientation sensor means for detecting the travelling direction of the vehicle and for transmitting an orientation signal,
   storing means for (i) counting the pulses when the vehicle starts running along the straight course, (ii) receiving said orientation signal when the count reaches a predetermined value, (iii) successively sotring in order, pairs of data, each pair consisting of running distance data corresponding to said count and orientation data, and (iv) successively reading out said pairs of the data in reverse order to said order of storing said data, when the travelling direction of the vehicle is reversed at the end of said course, and
   steering control means operatively connected to said position sensor means and said storing means for (a) steering said vehicle along said boundary in accordance with the detection of said boundary by said position sensor means and (b) steering said vehicle in accordance with said stored pairs of data in response to said boundary remaining undetected by said position sensor means for a predetermined time.

2. An automatic running work vehicle as in claim 1 wherein said storing means includes memory means and addressing means for storing said pairs of data in an address assigned by said addressing means, said addressing means incrementing said address when the vehicle travels in a forward direction and decrementing said address when the vehicle travels in a reverse direction.

3. An automatic running work vehicle as in claim 1 wherein said storing means includes memory means and addressing means, and wherein said pairs of data stored while each course is traveled are blocks transferred into a reversed order when the vehicle is reversed at the end of said each course.

4. An automatic running work vehicle as in claim 1 wherein said orientation sensor means detects a steering direction and an angular deflection of front wheels corresponding to an amount of steering of the vehicle.

5. An automatic running work vehicle controllable to travel along a series of parallel straight courses on a defined work site, following a boundary between a worked area and an unworked area, and to reverse its travelling direction at an end of each of the courses, said vehicle comprising:
   a plurality of position sensor means for detecting said boundary and a beginning and an end of said courses,
   transmitter means for transmitting a pulse per unit of travelling distance upon detection of said beginning of the course by said position sensor means, and for continuing to transmit said pulse per unit of travelling distance until detection of said end of the course by said position sensor means,
   orientation sensor means for detecting the travelling direction of the vehicle and for transmitting orientation data, and
   a control unit including a memory, an input interface connected to said position sensor means, said transmitter means and said orientation sensor means, and an output interface connected to steering means,
   said control unit being adapted to transmit to said steering means a signal in accordance with signals from said position sensor means for steering said vehicle along said boundary, to count said pulses received from said transmitter means, and to store in said memory said orientation data received from said orientation sensor as associated with said count while said vehicle runs from said beginning to said end of said course, and when said boundary remains undetected by said position sensor means for a predetermined time, said control unit transmits to said steering means a signal in accordance with orientation data associated with a count reached during a preceding straight course running and corresponding to a count reached upon lapse of said predetermined time.

6. An automatic running work vehicle as in claim 5 wherein said storing means includes memory means and addressing means, and wherein said travelling distance data and said orientation data stored while each course is travelled are blocks of information, transferred into a reversed order when the vehicle is reversed at the end of said course.

7. An automatic running work vehicle as in claim 5 wherein said orientation sensor means detects a steering direction and an angular deflection of front wheels corresponding to an amount of steering of the vehicle.

* * * * *